April 19, 1966 E. G. FRIDRICH 3,247,477

PHOTOCONDUCTIVE ELECTRICAL COMPONENT

Filed Oct. 3, 1962

Inventor:
Elmer G. Fridrich
by Henry P. Truesdell
His Attorney

United States Patent Office 3,247,477

Patented Apr. 19, 1966

3,247,477
PHOTOCONDUCTIVE ELECTRICAL COMPONENT

Elmer G. Fridrich, South Euclid, Ohio, assignor to General Electric Company, a corporation of New York
Filed Oct. 3, 1962, Ser. No. 228,180
2 Claims. (Cl. 338—15)

The present invention relates to new and improved electrically insulating matrices used for electrosensitive and electrically photosensitive materials having a variety of useful applications and to a new and improved method of making such matrices. More particularly, the present invention is concerned with new and improved electrosensitive and electrically photosensitive components and devices, and includes a new and novel method for preparing such devices.

Electrosensitive materials are herein defined generally as materials that respond in a definite and useful manner to an electric charge or an electric current. Some examples of such behavior are found in both A.C. and D.C. electroluminescent crystals and in piezoelectric crystals. Moreover, the effect is reversible in piezoelectric devices in that a change in pressure or deformation of the crystals can cause a voltage to be produced. An electrically photosensitive material is one whose electrical properties are altered in a material and useful manner by the presence or absence of electromagnetic radiation in or near the visible range. Photoconductive and photovoltaic crystals are examples of electrically photosensitive materials. The present invention will be described in relation to photoconductive devices, but it will be understood by those familiar with the art that the invention is likewise applicable in the broader fields of electrosensitive and electrically photosensitive devices. These two groupings exhibit similar characteristics for the purposes of this invention as will be seen from the following specification, drawing and claims.

A photoconductive cell may be defined as a device which exhibits a reduced resistance to the flow of electric current when subjected to irradiation such as light. Ideally, a photoconductive cell should be a perfect insulator in the absence of such irradiation and, correspondingly, should be a perfect conductor when subjected to the specified intensity of such irradiation. Actually, however, a photoconductive cell functions as a high resistance conductor in the absence of light and as a low resistance conductor in the presence of light. The current passed by the device in total darkness is generally referred to as the "dark current," whereas the current transmitted when the cell is irradiated is called the "light current." The difference between the light current and the dark current is referred to as the photocurrent.

Presently, most commercially available photoconductive devices fall into either one of two categories. One type comprises a single crystal of a photoconductive material having electrodes attached thereto. Such single crystal photocells have been found to exhibit rather high ratios of light current to dark current and consequently are characterized by high photosensitivity. However, the crystal employed in such a cell is generally small in size and the amount of current which may be passed through the crystal is thus rather limited, since a high current transmitted through such a small body may heat up the crystal to an extent such that its photosensitivity is either temporarily or permanently impaired. Larger crystals which would permit the transmission of higher currents unfortunately are difficult to grow and are extremely fragile. Accordingly, though the single crystal photocells have particularly desirable characteristics, the scope of their use is severely handicapped due to the rather prohibitive expense incurred both in their manufacture and in their maintenance.

The second type of photoconductive device currently available is referred to as the "powder type photocell," and generally comprises a body including finely divided photoconductive particles sintered together with electrodes attached to the body. In contrast to the single crystal photocells described above, powder type photocells may be made in any desired size, shape, or current carrying capacity. However, devices of this type have generally been characterized by low values of photosensitivity, relatively high values of resistance when irradiated with light, and extremely slow response compared to single crystal devices. These disadvantages have been attributed primarily to the large number of electrical barriers that are present between the electrodes of the device. The current which passes between these electrodes must, of necessity, travel through chains of powdered particles. Accordingly, the resistance due to the contact between adjacent particles is multiplied by the number of particles, the total resistance thus partially or totally masking the photosensitivity of each particle by limiting the maximum amount of current that may be passed therethrough. Additionally, the increase in temperature of the cell due to the increased resistance may cause the photosensitivity to be diminished even further.

As a direct result of the present invention however, a photoconductive cell may be provided which possesses not only the advantage of both the single crystal as well as the powder type photocell, but which also is devoid of many of the limitations appurtenant to the use of either one of these devices. Similar problems exist in the arts of photovoltaic, A.C. and D.C. electroluminescent and piezoelectric devices.

Accordingly, it is the primary object of the present invention to provide a new and improved electrically insulating matrix body having a variety of useful applications and a new and unique method of making such a matrix body.

Another object of the present invention is to provide a new and improved electrosensitive or electrically photosensitive component or device and a new and unique method of making such an article.

Still another object of the present invention is to provide a new and improved photoconductive body or cell and a new and unique method for producing such photoconductive bodies or cells.

Briefly stated, these and other objects may be attained in accordance with the present invention by providing a matrix comprising a thin, solid, electrically insulating sheet interlocking a plurality of conducting crystals, wherein the crystals are embedded in and extend from both sides of the solid, electrically insulating sheet thereby making electrical connections feasible.

The new and improved method for providing such a matrix body in accordance with the present invention comprises pressing between two resilient films a mixture comprising a plurality of crystals contained in a curable liquid of electrically insulating material to cause the upper and lower faces of the crystals to be embedded in the respective surfaces of the resilient films, and to be respectively above and below the compressed layer of the curable liquid, curing the liquid to form a solid, electrically insulating sheet, and stripping off the two soft resilient films to provide a matrix comprising a plurality of crystals, each of which is embedded in and extends from both sides of a solid, electrically insulating sheet.

Still other objects and advantages will be apparent from the specification and the accompanying drawings which illustrate an embodiment of the present invention and in which.

As will be appreciated by those skilled in the art, a particularly useful application of the new and improved matrix body produced in accordance with the present invention resides in the provision of new and novel photoconducting bodies which exhibit the high photosensitivity normally characteristic of single crystal photoconductors, and further which may be produced in any desired size, shape, or current carrying capacity in either flexible or rigid form.

Figure 1:
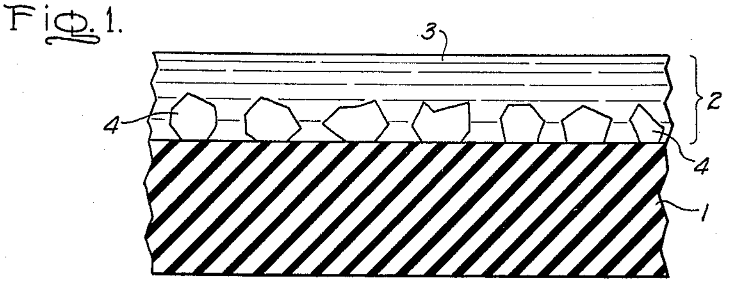
FIG. 1 is an enlarged fragmentary sectional view of a mixture comprising a plurality of crystals contained in a curable liquid of electrically insulating material which has been applied to the surface of a resilient film.

Referring now more particularly to the drawings, FIG. 1 illustrates a mixture 2 comprising a plurality of crystals 4 dispersed in a curable liquid of electrically insulating material 3 disposed over the surface of a resilient film 1. Crystals 4 may constitute relatively coarse crystals of cadmium sulfide having diameters of about 10 mils. Depending upon the requirements of a particular installation, the size of the crystals employed may vary within a wide range.. However, in the production of photoconductive devices, it may be advantageous to employ crystals having diameters ranging from ½ to 10 mils.

As will be appreciated by those skilled in the art, the crystals employed in accordance with the present invention, in order to provide a photoconductive body or cell, may be selected from a variety of photoconductive materials. Included among the materials which can be successfully employed are crystals of lead sulfide and the sulfides, selenides and sulfoselenides of cadmium.

The curable liquid of insulating material 3 employed to provide a matrix body in accordance with the present invention may comprise any liquid or semi-solid material capable of being hardened or cured to provide a solid electrically insulating sheet. It should be understood therefore that the term "curable" as used in the present specification and the appended claims means that the liquid employed may subsequently be transformed into a solid electrically insulating sheet. Accordingly, should a thermosetting resinous material such as an epoxy resin, for example be employed for this purpose, solidification or curing may be accomplished by heating the mixture 2 to the proper temperature to effectuate a cross-linking of the resin. In the event a thermoplastic material is employed, it may be advantageous to melt the material used to form the mixture 2, and subsequently to effectuate a "cure" of that liquid by allowing it to cool, and thus to solidify. Moreover, in certain instances solidification of a liquid or semi-solid mass may be effectuated by subjecting the material to some form of high energy radiation. Thus, it should be understood that any liquid or semi-solid material, either natural or synthetic, which may be formed into a solid sheet may be employed to provide the solid electrically insulating sheet in accordance with the present invention. Examples of such materials are synthetic organic thermosetting resins such as epoxy resins, i.e., the reaction products of a polyhydric compound such as bisphenol A or ethylene glycol with an epihalohydrin such as epichlorohydrin; melamine formaldehyde resins, phenol furfural resins, and urea formaldehyde resins, to mention but a few. In addition, a variety of thermoplastic materials may be employed such as, for example, glass, as well as organic resinous materials such as plastisol, a vinyl resin dissolved in a non-volatile plasticizer, polyamide condensation products of caprolactam (i.e. nylon), polyethylene, polyvinylchloride, polyvinylidine chloride, polyester resins such as polyethyleneterephthalate, polycarbonate resins, such as the reaction products of bisphenol A and diphenyl carbonate.

As shown in FIG. 1, the mixture 2 comprising a plurality of crystals dispersed in a curable liquid is disposed over the surface of a resilient film 1 such as a silicone rubber film, for example. This mixture may be formed by admixing the crystals with the curable liquid to form the mixture prior to the application thereof to the surface of the resilient film 1. Alternatively, the liquid may be applied to the film and the crystals subsequently scattered thereon, or vice versa.

It should be understood that the resilient film 1 may constitute any material possessing a sufficient degree of resilience to permit the faces of the crystals 4 to become embedded in the surface of the film upon the application of pressure. Included among the materials which may successfully be employed as the resilient film in accordance with the present invention are natural and synthetic soft rubber films, Teflon, silicone rubber and polyethylene.

Figure 2:
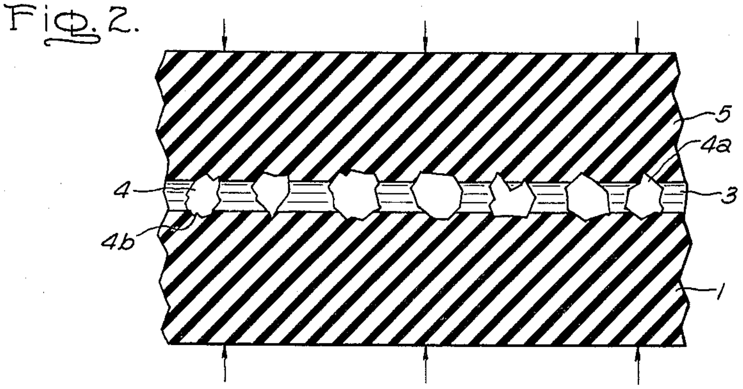
FIG. 2 is an enlarged fragmentary sectional view of a mixture comprising a plurality of crystals contained in a curable liquid of electrically insulating material which is being pressed between two resilient films.

In FIG. 2, a second resilient film 5 similar to the first has been placed over the mixture comprising a curable liquid 3 and crystals 4, and pressure has been applied as indicated by arrows to both the lower and upper resilient films 1 and 5 to cause the upper and lower faces *4a*, *4b* of the crystals to become embedded in the respective film surfaces and to be respectively above and below the layer of curable liquid. Thus, the extremities of each crystal are bared of the curable liquid of insulating material. Upon effectuating a cure of the liquid employed, and removing the upper and lower resilient films 1 and 5, a matrix body of the type shown in FIG. 3 is thus provided.

In order to compress the stacked structure as illustrated in FIG. 2, to cause the upper and lower faces of each of the crystals to become embedded in the respective surfaces of each of the resilient films and thus to be above and below the compressed layer of the curable liquid, the stacked assembly may be placed between press platens of a suitable hydrostatic press and pressure applied thereto.

Depending upon the viscosity of the liquid material employed to provide the solid electrically insulating sheet which forms the matrix body of the present invention, it is generally necessary to maintain the pressure on the resilient films throughout the period of solidification of the curable liquid material. Should the liquid have a relatively low viscosity, the pressure on the respective resilient films would have to be maintained throughout the period of cure in order to maintain the upper and lower faces of the crystals bared of the liquid. On the other hand, should a highly viscous or semi-solid material be employed to form the crystal-containing mixture, it might be possible to remove the pressure prior to the completion of the cure of the material employed without disrupting the desired matrix form.

Figure 3:
FIG. 3 is an enlarged fragmentary sectional view of a new and improved matrix body with interlocked crystals which has been produced in accordance with the present invention.

FIG. 3 illustrates a completed matrix body provided in accordance with the present invention. The two resilient films, not shown, have been stripped off the formed matrix body to leave a solid electrically insulating sheet 6 interlocking a plurality of crystals 4 wherein each crystal is embedded in and extends from both sides of the thin, solid sheet.

Figure 4:
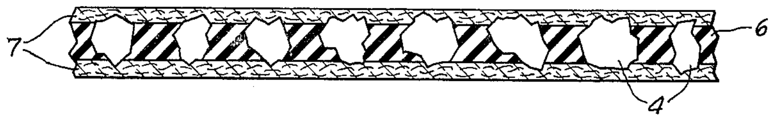
FIG. 4 is an enlarged fragmentary sectional view of a new and improved photocell which has been provided in accordance with the present invention.

A new and improved photocell which has been provided in accordance with the present invention and which comprises a solid sheet of electrically insulating material 6 interlocking a plurality of photoconductive crystals 4 each of the crystals embedded in and extending from both sides of the sheet, and electrode means 7 in contact with the crystals is shown in FIG. 4. Suitable electrode means may comprise, for instance, transparent or translucent conducting layers of glass paper, such as, for example, the commercially available micro-fiber glass paper nominally 0.001 to 0.003 inch thick. Conductivity is imparted to such paper by dipping the paper in a solution of a metal salt and subsequently drying and baking the paper at elevated temperatures to provide a conductive coating on the surface portions of the constituent glass fibers. A suitable solution employed for rendering such glass paper conductive comprises indium basic trifluoroacetate ($In(OH)(CF_3CO_2)_2$) with stannic chloride ($SnCl_4$) dissolved in an organic solvent such as ethylene glycol monoethyl ether acetate. In this regard, reference may be made to U.S. Patent 2,849,339, Jaffe, assigned to the same assignee as is the present invention for a more complete description of the materials and processes employed in providing such a glass paper.

In order that those skilled in the art may better appreciate how the present invention may be practiced, the following examples are given by way of illustration and not by way of limitation. All parts and percentages are by weight unless otherwise noted.

*Example 1*

Photosensitive cadmium sulfide crystals classified by sifting to an average diameter of 5 mils may be added to a viscous plastisol liquid. The mixture is spread on a 5 mil thick film of medium density polyethylene giving a random distribution to the cadmium sulfide particles.

A second 5 mil thick film of medium density polyethylene may thereafter be applied over the plastisol-crystal mixture and the assembly compressed by placing it between the platens of a hydraulic press and slowly applying a pressure of the order of 300 p.s.i. to extrude the excess plastisol. While under compression the assembly is heated to 150° C. After cooling the pressure is released, the stacked assembly removed from the press and the two resilient films of polyethylene stripped off to leave a matrix body comprising a thin, solid, electrically insulating sheet interlocking a plurality of crystals, each of which is embedded in and extends from both sides of the sheet.

*Example 2*

Photosensitive cadmium sulfide crystals classified by sifting to an average diameter of 3 mils may be deposited by well known electrostatic coating techniques such as those used to make sandpaper on a strip of paper coated with a tacky uniform layer of polystyrene dissolved in a slow-drying solvent. The electrostatic coating process utilizes projection of particles by an electrostatic field. Like charges on the crystals cause mutual repulsion during projection and thereby produce an even distribution of particles with the longer axis of the crystal generally perpendicular to the paper base. After the solvent has evaporated a solution of Epon 828 resin containing 10–12 parts per hundred of resin in triethylene-tetramine may be poured in the center of a sheet of the sandpaper like material. A 5 mil thick film of polyethylene is placed over the Epon resin and the assembly compressed by placing it between the platens of an hydraulic press. The excess resin is extruded at the edges of the assembly as the pressure is raised to about 300 p.s.i. While under compression the temperature is raised to about 120° C. and held for 15 min. to cure the resin. Thereafter the pressure may be released, the laminated assembly removed from the press and the polyethylene film stripped off mechanically. The paper layer may be stripped off by soaking in toluene to dissolve the polystyrene adhesive layer leaving a matrix body comprising a thin, solid, electrically insulating sheet interlocking a plurailty of crystals, each of which is embedded in and extends from both sides of the sheet.

*Example 3*

A photoconductive cell may be prepared by placing the matrix body prepared in accordance with Example 2 between two sheets of conducting glass paper which in turn are faced with sheets of mica mat saturated with epoxy resin, prepared in accordance with applications of Robert V. Levetan, Serial Nos. 118,112 and 118,113, both filed on June 19, 1961, and assigned to the same assignee as the present invention. The assembly (such as the assembled layers of mica mat, glass paper, photoconductive matrix body, glass paper, mica mat) is placed between the platens of an hydraulic press and heated to 200° C. for six minutes at 300 p.s.i. pressure to cause the epoxy resin in the mica mat to penetrate the glass paper and cure. The resulting photoconductive cell comprises a thin solid sheet of epoxy resin interlocking the cadmium sulfide crystals, each of which is embedded in epoxy resin and extends on both ends into the conducting glass paper layers.

As will be appreciated by those skilled in the art, the present invention provides a new and improved method for producing a novel matrix body having a variety of useful applications. A photoconductive body or cell provided in accordance with the present invention will accordingly exhibit the respective advantages of both the powder type as well as the single crystal type photocell. A specific advantage of the new and improved type of photoconducting body or cell produced in accordance with the present invention is that it can be made into thin, flexible sheets or films, and accordingly may be wrapped or wound in suitable rolls. As described in this example, the photoconductive body of the present invention is light sensitive on its opposite sides and may therefore be used to advantage where two different light sources are employed to operate the same photoconductive element.

*Example 4*

A photoconductive cell may be prepared by laminating a transparent, conductive layer on one side of the photoconductive matrix body in the manner described in Example 3 and laminating on or applying an opaque conducting layer on the other side.

*Example 5*

A picture intensifier may be prepared by laminating onto the opaque conducting layer of the photoconductive cell prepared in accordance with Example 4, successively an electroluminescent dielectric layer and a transparent conducting layer. In this case the conductivity of the opaque conducting layer is maintained at a sufficiently low level so that only the area in the electroluminescent layer in the immediate vicinity of each photoconductive particle will be illuminated respectively when a corresponding photoconductive particle is activated by radiation from the reverse side.

Moreover, photoconductive devices and elements prepared in accordance with the present invention may be employed in devices such as meters, relays, pick-up devices, switches, etc. Similar techniques may be employed with photovoltaic crystals to produce photovoltaic bodies. As stated above, this invention is also novel and useful in the arts of A.C. and D.C. electroluminescence and piezoelectrics and is generally applicable to electrosensitive and electrically photosensitive materials and devices.

Thus, it has been shown that electrosensitive and electrically photosensitive materials have similar characteristics for the purposes of this invention in that an electrically insulating matrix allowing electrical contact on each of two sides of a multiplicity of individual crystals is novel and useful in devices of either of the two types.

Although a few specific embodiments of the present invention have been described in detail, it should be understood that the present invention is not to be considered limited to those embodiments but may be used in other ways without departure from the spirit of the invention and the scope of the appended claims.

What I claim as new and desire to secure by Letters Patent of the United States is:

1. An electrical component comprising a solid electrically insulating sheet interlocking a plurality of dispersed single crystals of at least one material selected from the group consisting of electrosensitive materials and electrically photosensitive materials, essentially all of said crystals having major intermediate portions embedded in and irregular end portions protruding from and exposed at both sides of said sheet, said crystals having irregular geometries and being dispersed in said sheet with random crystallographic orientations, and electrically conductive electrode means in contact with each side of said sheet, with essentially all of said irregular end portions of said crystals embedded in said electrode means.

2. A photoconductive cell comprising a solid sheet of electrical insulating material interlocking a plurality of dispersed photoconductive single crystals, essentially all of said crystals having major intermediate portions embedded in and irregular end portions protruding from and exposed at both sides of said sheet, said crystals having irregular geometries and being dispersed in said sheet with random crystallographic orientations, and electrode means comprising electrically conductive layers in contact with each side of said sheet, with essentially all of said irregular end portions of said crystals being embedded in said conductive layers, at least one of said conductive layers being at least partially light transmitting.

References Cited by the Examiner

UNITED STATES PATENTS

| | | | |
|---|---|---|---|
| 2,747,104 | 5/1956 | Jacobs | 338—17 |
| 2,758,256 | 8/1956 | Eisler | 174—68.5 X |
| 2,777,040 | 1/1957 | Kazan | 338—17 |
| 2,796,505 | 6/1957 | Bocciarelli | 338—329 X |
| 2,861,160 | 11/1958 | Hersh | 29—155.62 |
| 2,873,509 | 2/1959 | Sorber | 29—155.62 |
| 2,912,592 | 11/1959 | Mayer | 338—17 X |
| 2,955,269 | 10/1960 | Silvey | 338—15 |
| 2,997,677 | 8/1961 | Lubin | 338—15 |
| 3,157,735 | 11/1964 | Stroup et al. | 174—94 |

RICHARD M. WOOD, *Primary Examiner.*